UNITED STATES PATENT OFFICE.

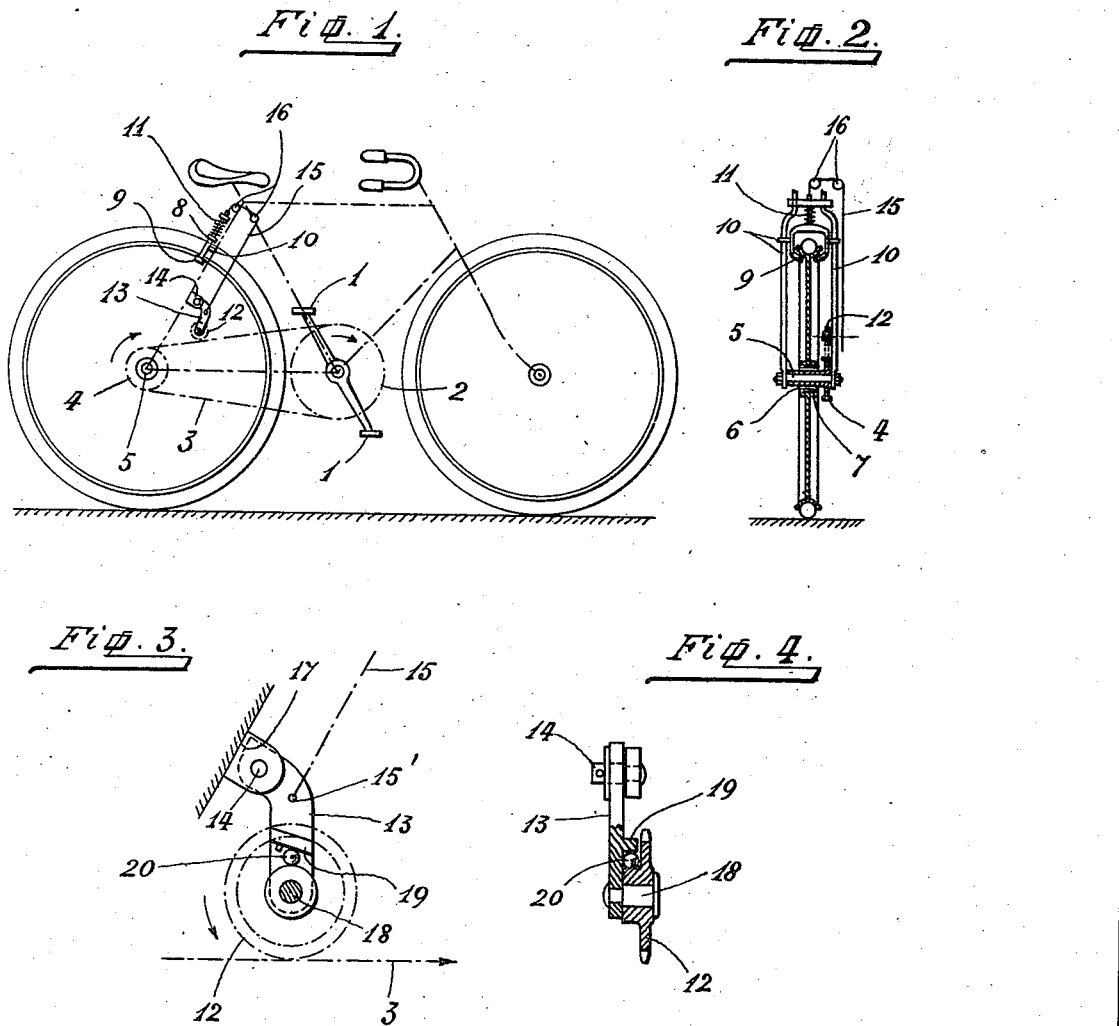

FRITZ PLETSCHER, OF LUCERNE, SWITZERLAND.

REAR BRAKE FOR MOTOR AND OTHER CYCLES.

1,421,552. Specification of Letters Patent. Patented July 4, 1922.

Application filed September 2, 1921. Serial No. 498,025.

(GRANTED UNDER THE PROVISIONS OF THE ACT OF MARCH 3, 1921, 41 STAT. L., 1313.)

*To all whom it may concern:*

Be it known that I, FRITZ PLETSCHER, a citizen of the Republic of Switzerland, and resident of Lucerne, in the Canton of Lucerne, Switzerland, have invented certain new and useful Improvements in Rear Brakes for Motor and Other Cycles (for which I have filed application in Switzerland Dec. 17, 1919, Patent No. 86,502), of which the following is a specification.

This invention is for improvements in brakes for motor- and other cycles with free-wheels, and concerns more particularly a rear-brake adapted to be operated by the movement of the pedals in a backward direction.

Brakes of this kind are already known, the hind-wheel being set free by the backward movement of the pedals and the usual and known mechanism provided for this purpose, the backward movement of the pedals also causing a brake to be put in operation which is mounted on the hub of the free-wheel. Such arrangement, however, has the great drawbacks that the brake, for the very reason that it is mounted on the hub of the wheel, is not sensitive enough and that it is subjected to considerable strains of torsion, the working parts of the brake thus being subject to rapid wear.

It is the object of the present invention to provide a simple and efficient device combining the advantages of a rear brake adapted to be operated by the backward movement of the pedals with the advantages of a brake acting on the rim of the free-wheel of the motor- or other cycle.

I have illustrated a desirable form in which my invention may be embodied in the accompanying drawings, wherein:—

Fig. 1 shows a side elevation, mostly in diagrammatical form, of a bicycle with the said device applied;

Fig. 2 shows an end elevation, partly in section, of Fig. 1, and

Figs. 3 and 4 illustrate a front and side view, respectively, of certain details on a larger scale and partly in section.

Referring to these drawings, 1 designates the pedals, 2 the driving chain-wheel, 3 the chain, 4 the driven chain-wheel, and 5 the axle of the free or hind-wheel journaled at 6. The bearing 6 for the free-wheel is fitted between the axle 5 and the hub 7 of such wheel and may be of any suitable and known construction for which reason it is indicated in Fig. 2 in diagrammatical form only.

At 8 is mounted an ordinary brake adapted to act on the inner face of the rim of the free-wheel and comprising brake jaws 9 made slidable on guide rods 10 in a radial direction, and a spring 11 which has the tendency to keep the said jaws away from contact with the wheel rim. Engaging with the chain 3 is a small chain-wheel 12, Figs. 1, 3 and 4. This chain-wheel can only rotate in the direction of the arrows and is supported by and bearing in a lever arm 13, the latter in turn being pivoted at 14 to a bracket fixed to one of the guide rods 10 which form part of the cycle frame. A wire, cord or the like 15 is secured at 15′ to the lever arm 13 and led over two rollers 16 also mounted on the cycle frame, the other end of the wire 15 being connected with the brake 8.

In action the device described operates as follows: As long as the pedals 1, the chain-wheel 2 and the chain 3 are moved in the direction of the arrows, that is in a direction corresponding with the forward movement of the cycle, the small chain-wheel 12 rotates in a like direction without shifting the lever arm 13 from its position. A stop 17 formed on the top part of this arm in any case prevents movement to the right of said arm further than that shown in Figs. 1 and 3, and since the arm 13 does not move, the brake owing to its control by the spring 11 remains out of action. If the cyclist desires to apply the brake, he causes the pedals to turn backwards thereby causing a similar movement of the chain-wheel 2 and chain 3 without, however, making the hind-wheel to rotate since the same has meantime been freed by the free-wheel gear fitted at 6. The small chain-wheel 12 engaging the chain 3 and able to rotate in the direction of the arrows only has hereby the tendency to rotate in an opposite direction but is prevented from such movement by a free-wheel gear hereinafter described which causes the lever arm 13 to be pulled to the left. This movement is transmitted by the wire 15 to the brake at 8 which is thus applied to the hind-wheel. At the moment when the retrograde motion of the pedals ceases and the latter are again turned in a forward direction, the action of the brake is interrupted.

One form of construction of the free-wheel gear for the chain-wheel 12 is illustrated in Figs. 3 and 4 by way of example.

The lever arm 13, at the lower end of which a pin 18 is secured to serve as a bearing for the rotatable chain-wheel 12, is formed at 19 with an integral and oblique projection between which and the hub of said wheel a ball 20 is located in such a manner that when the chain-wheel 12 rotates in the direction of the arrows, the ball 20 is freed from its previously locked position thereby allowing the wheel 12 to rotate freely. Upon rotation of said wheel 12 in an opposite direction the ball is forced tightly between the oblique projection 19 and the wheel-hub, thus stopping the chain-wheel 12. If the chain 3 nevertheless causes a rotation of 12 in an opposite direction to that of the arrows the lever arm 13 is moved accordingly and the brake put in operation.

It will be easily understood that this form of construction may be modified in many ways. For instance, the arm 13 may be rigidly attached to one of the guide rods 10 and the chain-wheel provided with internal teeth in such a manner that a pawl or detent, which is secured to a disc journaled on the pin 18, is causing the said disc to turn when the pedals and consequently the chain 3 are moved in a direction opposite the direction indicated by the arrows. The disc mentioned is hereby formed with a projection which serves as a means to attach the wire or cord 15.

What I claim as new and desire to secure by Letters Patent is:—

1. In the herein-described brake for motor- and other cycles fitted at the rear of the cycle frame and comprising spring-controlled jaws adapted to act on the rim of the hind-wheel, the combination, with the pedals and chain-drive of the cycle, of an intermediate chain-wheel meshing with the driving chain, means to support the said chain-wheel and allow it to rotate in a forward direction only, gearing to connect the movable support with the brake, and means to actuate the gearing and the brake when the pedals are turned in a backward direction, all as and for the purpose set forth.

2. In the herein-described brake for motor- and other cycles fitted at the rear of the cycle frame, the combination with the pedals and the chain-drive of the cycle, of an intermediate chain-wheel engaging with the driving chain, a lever arm pivotally mounted on the front stays of the cycle frame and carrying the said chain-wheel, a wire connecting the lever arm with the aforesaid brake, and means to exert a pull on the wire and actuate the brake when the pedals are turned in a backward direction, all substantially as and for the purpose set forth.

3. In the herein-described brake for motor- and other cycles fitted at the rear of the cycle frame, the combination with the pedals and chain-drive of the cycle, of an intermediate chain-wheel engaging with the driving chain, a lever arm pivotally mounted on the front stays of the cycle frame and carrying the said chain-wheel and having an integral and oblique projection at one side, a ball located between the said projection and the hub of the intermediate chain-wheel, and a cord connecting the lever arm with the aforesaid brake, all substantially as and for the purpose specified.

In testimony whereof I have hereunto set my hand in the presence of two subscribing witnesses.

FRITZ PLETSCHER.

Witnesses:
N. ZUND,
G. C. WACHS.